United States Patent
Yang et al.

(10) Patent No.: US 9,220,001 B2
(45) Date of Patent: Dec. 22, 2015

(54) METHODS AND SYSTEMS FOR GROUP CALLS IN A WIRELESS COMMUNICATION NETWORK

(75) Inventors: Zhou Yang, Sichuan (CN); Zheng Cao, Sichuan (CN); Rui Qi Wu, Sichuan (CN); Jun Yang, Sichuan (CN)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 453 days.

(21) Appl. No.: 13/816,872

(22) PCT Filed: Sep. 28, 2010

(86) PCT No.: PCT/CN2010/077414
§ 371 (c)(1),
(2), (4) Date: Feb. 13, 2013

(87) PCT Pub. No.: WO2012/040909
PCT Pub. Date: Apr. 5, 2012

(65) Prior Publication Data
US 2013/0136037 A1 May 30, 2013

(51) Int. Cl.
*H04L 12/26* (2006.01)
*H04W 4/16* (2009.01)
*H04W 76/00* (2009.01)
*H04W 8/18* (2009.01)

(52) U.S. Cl.
CPC .............. *H04W 4/16* (2013.01); *H04W 76/002* (2013.01); *H04W 8/186* (2013.01)

(58) Field of Classification Search
CPC ... H04W 8/186; H04W 76/08; H04W 76/005; H04W 4/06; H04W 36/0027
See application file for complete search history.

(56) References Cited

U.S. PATENT DOCUMENTS

2007/0206533 A1   9/2007   Wiatrowski et al.

FOREIGN PATENT DOCUMENTS

CN        101378553        3/2009
WO        2009143195 A     11/2009

OTHER PUBLICATIONS

International Search Report dated Sep. 28, 2010 in parent case PCT/CN2010/077414.

*Primary Examiner* — Alvin Zhu
(74) *Attorney, Agent, or Firm* — Kenneth A. Haas

(57) ABSTRACT

Methods and systems are disclosed for forcing at least some members of a communication group to join a new group call when they are participating in an another group call to a different communication group. A wireless communication device that seeks to initiate the new group call transmits a request-to-transmit (RTT) on a reverse channel to initiate the new group call. This way, at least some of group members participating in the other group call can be allowed to join the new group call. The recipients of the RTT can then switch from a primary channel on which the other group call is taking place to an alternative channel to join the new group call. In one implemenation, the disclosed embodiments can be applied to a two-way wireless communication system that employs a TDMA channel access scheme.

20 Claims, 5 Drawing Sheets

METHODS AND SYSTEMS FOR GROUP CALLS IN A WIRELESS COMMUNICATION NETWORK

CROSS-REFERENCE TO RELATED APPLICATION

This application claims priority to PCT Application Serial Number PCT/CN2010/77414 filed Sep. 28, 2010 entitled "Methods And Systems For Group Calls In A Wireless Communication Network," the contents of which are expressly incorporated herein by reference in their entirety.

FIELD OF THE DISCLOSURE

The present disclosure relates generally to radio communication networks and more particularly to methods and systems for inviting group members participating in a group call to switch to anther group call in a two-way radio communication system, such as, a time division multiple access (TDMA)-based two-way digital radio communication system.

BACKGROUND

There are a number of two-way radio systems (also known as land mobile radio systems) that are either presently in use or currently being developed. Land mobile radio systems are primarily utilized to provide emergency communications to police officers, fire fighters and other emergency responders, and by professional and commercial entities, such as retail store chains, school systems, utilities companies, transportation companies and construction companies, and the like.

One mechanism for enabling peer-to-peer communications between users of such entities are two-way radio dispatch systems designed to operate over a wide area network (WAN). The two-way radio dispatch system includes multiple sites distributed over a wide area. At each physical site a minimal complexity base station is provided. Each base station can locate and establish connections to other peer base stations deployed at other physical sites directly over the Internet (or other WAN). As such, the peer base stations can communicate with each other over an Internet Protocol (IP) network without communicating through a centralized call control center, such as a Mobile Switching Center (MSC), or a public telephone network. This greatly reduces the costs for the entities that purchase the base stations to set up a two-way radio dispatch system. Once the peer base stations have established a connection with one another over the Internet, the infrastructure for setting up a two-way radio dispatch system is deployed, and wireless communication devices located at one particular physical site can then communicate (via the base station) with other wireless communication devices located at the other physical sites. Industries including transportation, education, construction, manufacturing, energy and utilities, private security, government, hospitality, retail, and many others are finding that these two-way radio systems are relatively easy and inexpensive to deploy, and that they can improve efficiency, worker productivity and responsiveness by allowing mobile teams to share business and customer information quickly.

In many cases, radio systems such as those described above support group communication or "group call" functionality for allowing simultaneous communications to a group of wireless communication devices.

In some networks, wireless communication devices may belong to two or more communication groups. For instance, wireless communication devices A, B, C could belong to a first communication group, and wireless communication devices A, C, D could belong to a second communication group. When wireless communication devices A, B, C that belong to the first communication group are actively involved in a call and a channel is occupied by an on-going transmission, wireless communication device D, for example, might want to initiate another call with wireless communication devices A and C that are members of the second communication group. However, methods are needed to provide for wireless communication device D to initiate the new group call, and/or wireless communication devices A and C to set up for the new call. Accordingly, it is desirable to provide a mechanism that allows wireless communication device D to initiate switching by the in-call group members to another group call initiated by wireless communication device D. In other words, it would be desirable to provide a mechanism that allows wireless communication device D, during an on-going group call, to notify members of a first communication group that a new group call to a different communication group is being initiated. In this manner, the wireless communication device D can initiate a second group call to wireless communication devices A and C that belong to the second communication group while the first group call (initiated by wireless communication device A) continues in progress.

Techniques have been developed to address this problem; however, each suffers from drawbacks.

For example, a priority monitor technique can be used where a wireless communication device (WCD) that receives a group call switches to a voice channel, and while on the voice channel the radio receives low-speed sub-audible group call data sent over the voice channel from the controller. If the WCD receives a group call having a higher priority it switches to the correct voice channel with the data which was sent sub-audibly over the previous voice channel.

A transmit interrupt technique can alternatively be used to interrupt a first voice group call by having the interrupting wireless communication device send a transmit interrupt request to the reverse channel, which then forces the transmitting wireless communication device to dekey at which point the interrupting wireless communication device can begin its voice transmission. However, the first voice group call that was taking place has to be terminated, which may be undesirable. In addition, the transmit interrupt technique may require a manual push-to-talk (PTT) operation to initiate a new call to different target after the previous call is terminated.

A scan technique can also be used to provide the capability of switching to a new call group. One drawback of scan techniques is that the receiving group members must enable the scanning feature and set or designate the channel used by the calling device as having priority. If either of these conditions are not met (e.g., the receiving group member does not enable the scan and switch to the priority channel in a timely manner when the calling device is transmitting), then the receiving group members can miss the transmission from the calling device. In addition, the scan technique requires manual operation of the calling device to terminate the on-going call in order to search for the new transmission.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 1 is a block diagram which illustrates a wide area two-way radio communications network in which various embodiments of the present invention can be implemented.

Figure 1:
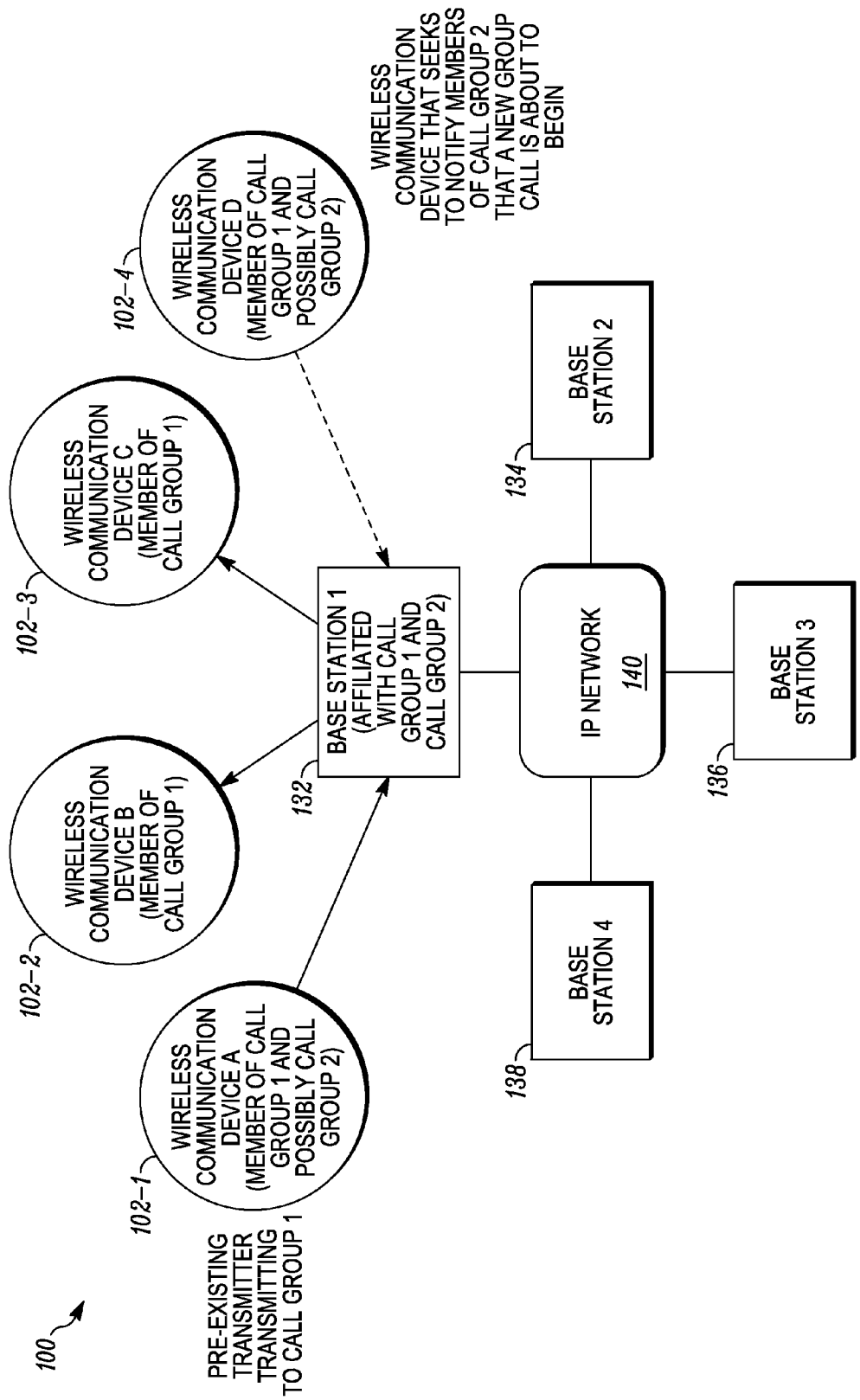

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

It would be desirable to provide methods and systems that are designed to automatically allow a wireless communication device to invite other wireless communication devices to switch to another group call while those other wireless communication devices are participating in another pre-existing or on-going group call without necessarily causing the pre-existing or on-going group call to be terminated.

Embodiments of the present invention generally relate to group communications in a two-way wireless communication system. Methods and systems are disclosed for inviting members of a communication group to join a new group call while they are participating in another group call to a different communication group. In one embodiment, a wireless communication device that seeks to initiate the new group call transmits a request-to-transmit (RTT) on a reverse channel to initiate the new group call. In this manner, at least some of group members participating in the other group call can be invited to join the new group call. The recipients of the RTT can then switch from a primary channel on which the other group call is taking place to an alternative channel to join the new group call. In one implementation, the disclosed embodiments can be applied to a half-duplex, two-way wireless communication system that employs a TDMA channel access scheme.

Embodiments of the present invention can apply to a number of network configurations. Prior to describing some embodiments with reference to FIGS. 2A-3B, one example of a network configuration in which these embodiments can be applied will now be described with reference to FIG. 1.

FIG. 1 is a block diagram which illustrates a two-way radio communications network 100 in which various embodiments of the present invention can be implemented.

As illustrated in FIG. 1, the network 100 may include a plurality of base stations 132, 134, 136, 138 that are communicatively coupled to each other via a communication link, and a plurality of wireless communication devices (WCDs) 102-1, 102-2, 102-3, 102-4. In one implementation, the communication link can be an Internet Protocol (IP) based communication link for transferring information between the base stations. For ease of illustration, only four wireless communication devices and four base stations are shown. However, those skilled in the art will appreciate that a typical system can include any number of wireless communication devices and any number of base stations distributed about in any configuration.

Examples of such networks 100 are described in a number of standards that relate to digital two-way radio systems. Examples of such standards include, the Terrestrial Trunked Radio (TETRA) Standard of the European Telecommunications Standards Institute (ETSI), Project 25 of the Telecommunications Industry Association (TIA) and ETSI's digital wireless communication device (DMR) Tier-2 Standard, which are incorporated by reference herein in their entirety. The TETRA standard is digital standard used to support multiple talk groups on multiple frequencies, including one-to-one, one-to-many and many-to-many calls. The TETRA standards and DMR standards have been and are currently being developed by the European Telecommunications Standards Institute (ETSI). The ETSI DMR Tier-2 standard is yet another digital radio standard that describes such two-way peer-to-peer communication system. Any of the TETRA standards or specifications or DMR standards or specifications referred to herein may be obtained at http://www.etsi.org/WebSite/Standards/StandardsDownload.aspx or by contacting ETSI at ETSI Secretariat, 650, route des Lucioles, 06921 Sophia-Antipolis Cedex, FRANCE. Project 25 defines similar capabilities, and is typically referred to as Project 25 Phase I and Phase II. Project 25 (P25) or APCO-25 refer to a suite of standards for digital radio communications for use by federal, state/province and local public safety agencies in North America to enable them to communicate with other agencies and mutual aid response teams in emergencies. The Project 25 (P25) specifies standards for the manufacturing of interoperable digital two-way wireless communications products. Developed in North America under state, local and federal representatives and Telecommunications Industry Association (TIA) governance, P25 is gaining worldwide acceptance for public safety, security, public service, and commercial applications. The published P25 standards suite is administered by the Telecommunications Industry Association (TIA Mobile and Personal Private Radio Standards Committee TR-8). Any of the P25 standards or specifications referred to herein may be obtained at TIA, 2500 Wilson Boulevard, Suite 300, Arlington, Va. 22201.

Notably, the system does not require a centralized controller, meaning that base stations 132, 134, 136, 138 can communicate with each other without communicating through a traditional centralized call controller used in dispatch communication systems, such as a Zone Controller or Comparator.

The illustrated wireless communication devices 102, which may be, for example, a portable/mobile radio, a personal digital assistant, a cellular telephone, a video terminal, a portable/mobile computer with a wireless modem, or any other wireless communication device. For purposes of the following discussions, the communication devices will be referred to as "wireless communication devices," but they are also referred to in the art as subscriber units, mobile stations, mobile equipment, handsets, mobile subscribers, or an equivalent.

As illustrated, for example, the wireless communication devices 102 communicate over wireless communication links with base station 132. The base stations 132, 134, 136, 138 may also be referred to as base radios, repeaters, access points, etc. The base stations 132, 134, 136, 138 include at a minimum a repeater and a router and can also include other elements to facilitate the communications between WCDs 102, 104, 106, 108 and an Internet Protocol (IP) network 140. It will be appreciated by those of ordinary skill in the art that the base stations 132, 134, 136, 138 and the WCDs 102-1, 102-2, 102-3, 102-4 and can be, for example, part of a wide area network (WAN) that is distributed over a wide area that spans multiple access networks.

In some implementations, the WCDs 102-1, 102-2, 102-3, 102-4 can communicate with each other through base stations 132, 134, 136, 138. As is known by one of ordinary skill in the art, a base station generally comprises one or more repeater devices that can receive a signal from a transmitting wireless communication device over one wireless link and re-transmit to listening wireless communication devices over different wireless links. For example, wireless communication device 102-1 can transmit over one wireless link to base station 132 and base station 132 can re-transmit the signal to listening wireless communication devices such as WCDs 102-2, 102-3, 102-4 over another wireless link. In addition, WCDs 102-1, 102-2, 102-3, 102-4 may communicate with the other wireless communication devices (not shown) that are located in other "zones." Moreover, although in this embodiment communication between wireless communication devices are illustrated as being facilitated by base station 132, in some implementations the wireless communication devices can communicate directly with each other when they are in communication range of each other using a direct mode of operation without assistance of a base station.

The wireless communication devices 102-1, 102-2, 102-3, 102-4 and the base stations 132, 134, 136, 138 comprise transceivers that include a transmitter and a receiver for transmitting and receiving radio frequency (RF) signals, respectively. Typically, both the wireless communication devices and the base stations, further comprise one or more processing devices (such as microprocessors, digital signal processors, customized processors, field programmable gate arrays (FPGAs), unique stored program instructions (including both software and firmware), state machines, and the like.) and non-transitory memory elements for performing (among other functionality) the air interface protocol and channel access scheme supported by network 100. As will be described below, using these protocols, wireless communication devices can each generate RF signals that are modulated with information for transmission to the other WCDs or to the base stations.

The network 100 illustrated in FIG. 1 is a simplified representation of one particular network configuration, and many other network configurations are possible. Although not illustrated in FIG. 1, it will be appreciated by those skilled in the art that the network can include fewer or additional peer base stations 132, 134, 136, 138, and fewer or additional WCDs 102-1, 102-2, 102-3, 102-4.

Each WCD 102-1, 102-2, 102-3, 102-4 can belong to a one or more communication group (communication group 1 (CG1), CG2, . . . , CGX) which has its own communication group identifier. Each of the members of a particular communication group (CG1, CG2, . . . , CGX) share a communication group identifier that distinguishes those WCDs from other WCDs in the network that do not belong to the communication group. The WCDs belonging to a particular communication group are authorized to receive communications intended for that particular communication group.

For instance, in the examples that will be described below, the wireless communication device A 102-1 may belong to or is a member/affiliate of a first communication group (CG1) and may belong to the second communication group (CG2). Further, wireless communication device B 102-2 belongs to a first communication group (CG1) and does not belong to the second communication group (CG2), wireless communication device C 102-3 belongs to a first communication group (CG1) and the second communication group (CG2), and wireless communication device D 102-2 belongs to the second communication group (CG2). The wireless communication devices 102 may participate in one call for a communication group at any particular time.

Upon coming within communication range of the base station 132, each WCD registers with that particular peer base station. When a WCD associates with a particular peer base station, the WCD registers its device identifier (e.g., Media Access Control (MAC) address) and its communication group identifiers (CGIs) with that particular peer base station. The peer base stations 132-138 may communicate their registered CGIs to each other. In this manner, a particular base station may "affiliate" with all communication groups that it has received CGIs for (from WCDs), and other peer base stations will send or push any group communications affiliated with that particular peer base station to the particular peer base station so that the particular peer base station can then transmit those group communications (associated with the WCD's CGI) over the air to the WCD. Each peer base station 132-138 then becomes "affiliated" with each of the communication groups that have been registered with that particular peer base station (e.g., for each of the communication groups of its registered WCDs). The peer base stations 132-138 can regularly exchange affiliation information with each other. For example, when a wireless communication device 102 register/affiliates to a particular peer base station 132, then that particular peer base station 132 can provide its affiliation information to all other peer base stations 134-138 (or at least those known to have an affiliation with the same communication group or groups that have been affiliated at the particular peer base station 132). In this manner, each peer base station 132-138 knows the base station that each of the wireless communication devices 102 in the network is registered with and communicating through at any particular time.

In one implementation of the network 100, each peer base station (e.g., peer base station 1 132) and WCD (e.g., WCD 102) can communicate with one another using an "inbound" 25 kilo Hertz (kHz) frequency band or channel and an "outbound" 25 kHz frequency band or channel. As used herein, the term "inbound" refers to a communication originating from a portable wireless communication device that is destined for a fixed base station, whereas the term "outbound" refers to a communication originating from a fixed base station that is destined for a wireless communication device. In other implementations, inbound and outbound channels have a different bandwidth (e.g., 12.5 kHz, 6.25 kHz, etc) can be implemented. In the context of the implementation described above, for instance, the 25 kHz inbound and outbound sub-channels can be further divided using either Frequency-Division Multiple Access (FDMA) or Time-Division Multiple Access (TDMA) technologies to increase the number of WCDs that can simultaneously utilize those sub-channels.

Those skilled in the art will appreciate that the base stations and wireless communication devices may communicate with one another using a variety of air interface protocols or channel access schemes (e.g., Time Division Multiple Access (TDMA), Frequency Division Multiple Access (FDMA), and the like). For example, it may be desirable to improve or increase "spectral efficiency" of such systems so that more end-users can communicate more information in a given slice of RF spectrum. Thus, in some two-way digital radio systems, a particular channel, such as the 25 kHz channel described above, that historically carried a single call at a given time can be divided to allow for a single channel to carry two (or more) calls at the same time.

FDMA splits the channel frequency into two smaller sub-channels that can carry separate calls side-by-side. For example, Project 25 Phase I uses 12.5 kHz channels and currently uses FDMA for both trunked and conventional digital systems. In such implementations, a single 25 kHz channel can be divided into a 12.5 kHz outbound sub-channel for use by the peer base station when communicating to one of its registered WCDs and a 12.5 kHz inbound sub-channel for use by one of the registered WCDs when communicating with its peer base station. In still other implementations, the inbound 12.5 kHz sub-channel can be further divided into two 6.25 kHz sub-sub-channels to allow two WCDs to communicate with their peer base station at any given time using different 6.25 kHz frequency segments of the inbound sub-channel, and the outbound 12.5 kHz sub-channel can also be divided into two 6.25 kHz sub-sub-channels for communications from the peer base station to the two WCDs.

By contrast, TDMA preserves the full channel width, but divides a channel into alternating time slots that can each carry an individual call.

Examples of radio systems that utilize TDMA include those specified in the Terrestrial Trunked Radio (Tetra) Standard, the Telecommunications Industry Association (TIA) Project Phase II 25 Standard, and the European Telecommunications Standards Institute's (ETSI) Digital Mobile Radio (DMR) standard.

For example, Project 25 Phase II and the ETSI DMR Tier-2 standard implement two-slot TDMA in 12.5 kHz channels, whereas the TETRA standard that uses four-slot TDMA in 25 kHz channels.

For instance, a 12.5 kHz inbound sub-channel can be further divided into two alternating time slots so that a particular WCD can use the entire 12.5 kHz inbound sub-channel during a first time slot to communicate with the peer base station, and another wireless communication device can use the entire 12.5 kHz inbound sub-channel during a second time slot to communicate with the peer base station. Similarly, use of the 12.5 kHz outbound sub-channel can also be divided into two alternating time slots so that the particular peer base station can use the entire 12.5 kHz outbound sub-channel to communicate with a particular wireless communication device (or communication group of wireless communication devices) during a first time slot, and can use the entire 12.5 kHz outbound sub-channel to communicate with another particular wireless communication device (or another communication group of wireless communication devices) during a second time slot.

As can be seen from the following description, regardless of the multiple access technique that is implemented, the radio frequency (RF) resources available for communicating between a base station and its associated wireless communication devices are limited. As used herein, the term "RF resources" refers to a sub-sub-channel or a time slot within a sub-channel. One example of an RF resource is a time slot in TDMA-based systems, and another example is a frequency channel in FDMA-based systems. At any given time, a single RF resource can be allocated to either a communication group (e.g., one WCD communicating with two or more other WCDs) or a communication pair (e.g., two WCDs communicating only with each other).

As described above, when wireless communication devices belong to more than one communication group, it is desirable to provide methods and systems for interrupting an on-going call to a particular communication group so that another call to a different communication group. Methods and systems for interrupting an on-going "first" call to a "first" communication group will now be described. In accordance with the disclosed methods and systems, a wireless communication device that seeks to start a new call to a "second" communication group utilizes a reverse channel to communicate a control burst to other wireless communication device that belong to the second communication group. The control burst indicates that the new call for the second communication group is about to begin on an alternative channel (ACH). This allows the recipient wireless communication devices that are participating in a call to the first communication group to switch to the ACH before the new call is started to the second communication group on the ACH. The calls to both communication groups can continue (e.g., the first call will not be stopped unless the transmitter on is a member of the second communication group and decides to terminate the first call). Members of the second communication group can join the new call and will not miss any content of the call making it very beneficial particularly for data transmission. In addition, no centralized controller is required for coordinating the interrupt. Instead, this coordination can be accomplished via signaling between the wireless communications devices.

Figure 2A:
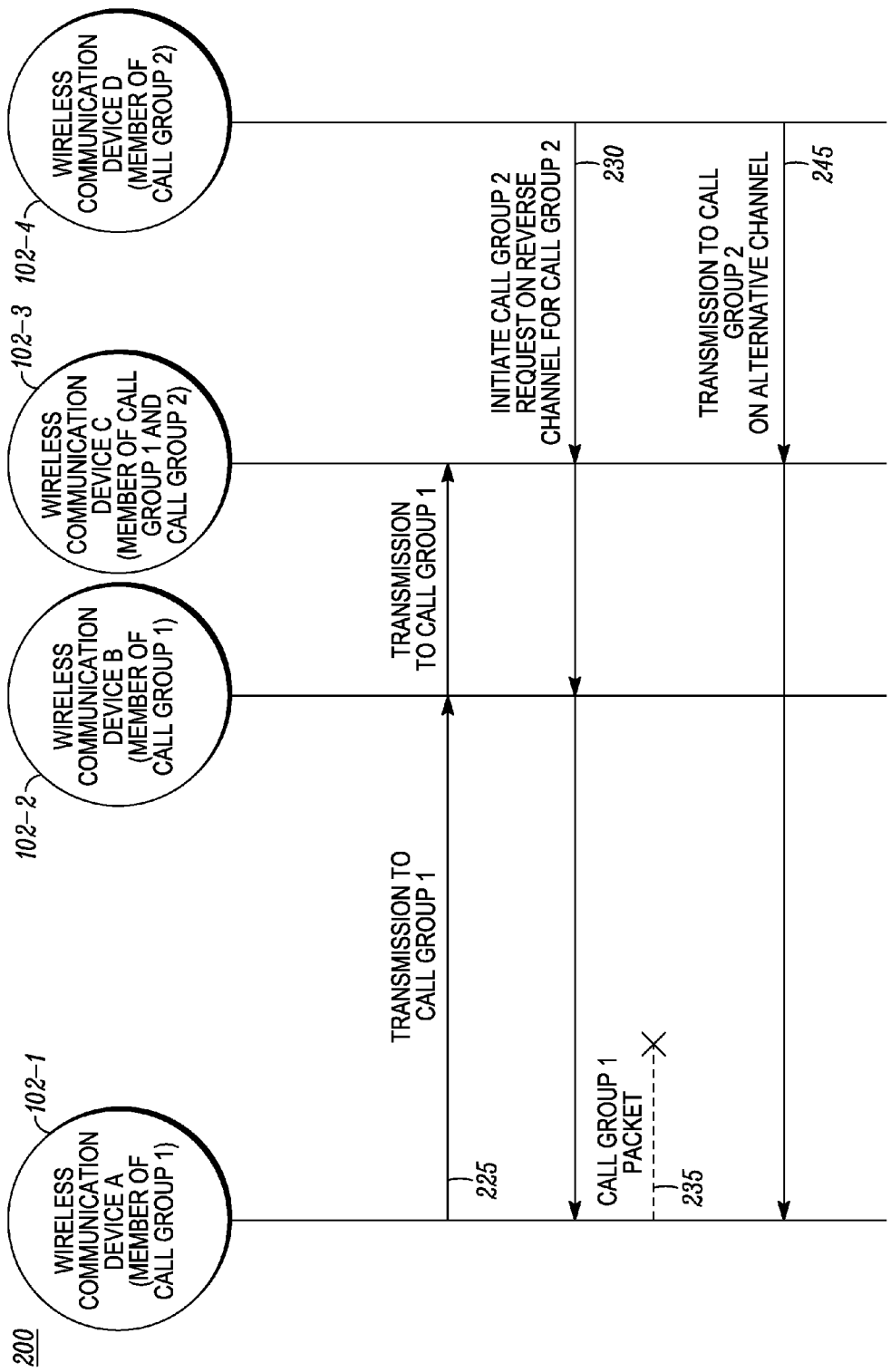
FIG. 2A is a communication flow diagram which illustrates distribution of information between wireless communication devices when the wireless communication devices are communicating with each other in direct mode in accordance with some of the disclosed embodiments.

FIG. 2A is a communication flow diagram 200 which illustrates distribution of information between wireless communication devices 102 in accordance with some of the disclosed embodiments when the wireless communication devices 102 are communicating with each other in direct mode. As used herein, the term "call" is defined broadly and refers to any exchange of information between members of a communication group including voice, data, and control signaling.

The communication flow diagram 200 will be described with reference to the communications network 100 of FIG. 1. In FIG. 2A, wireless communication device A 102-1 belongs to a first communication group (CG1) and does not belong to the second communication group (CG2), wireless communication device B 102-2 belongs to a first communication group (CG1) and does not belong to the second communication group (CG2), wireless communication device C 102-3 belongs to a first communication group (CG1) and the second communication group (CG2), and wireless communication device D 102-2 belongs to the second communication group (CG2). Further, wireless communication device A 102-1 is participating in an on-going "first" call for the first communication group (CG1), and wireless communication device D 102-2 seeks to initiate a second call with members of the second communication group (CG2) during the first call. The second communication group different than the first communication group, and each of the communication groups (CG1, CG2) may include additional wireless communication devices that are not illustrated in FIG. 1.

At communication 225, as part of a first call, the first wireless communication device A 102-1 transmits a first transmission over a first primary channel that is addressed to members of the first communication group (CG1), which includes wireless communication device B 102-2 and wireless communication device C 102-3. With respect to the first transmission, both wireless communication device B 102-2 and wireless communication device C 102-3 are unmuted since they are "target" members of the first communication group (CG1), whereas wireless communication device D 102-2 is muted since it is not a targeted member of the first communication group (CG1).

While a first call remains in progress, wireless communication device D 102-4 determines that it would like to make a new call to other members of the second communication group, which will be referred to below as a second call for sake of convenience. Wireless communication device D 102-4 will switch to an alternative channel (ACH) for a short inspection to determine if the ACH is available for the second call, and if so, will switch to a reverse channel (RCH) to transmit a request-to-transmit (RTT). The RTT will inform all wireless communication devices that are communicating on the primary channel (PCH), including the target wireless communication devices (e.g., the second group of wireless communication devices that belong to the second communication group), that the second call is about to begin, and thus initiate set-up of the second call with the target wireless communication devices. At communication 230, wireless communication device D 102-4 initiates a second call (or transmission) by transmitting the RTT on the reverse channel (RCH). It is noted that in FIGS. 2A and 2B, certain communications, such as communication 230, are represented with multiple arrows to illustrate that these communications are a single message transmitted from one radio and received by multiple destinations. This illustration is not intended to indicate that one recipient WCD is repeating or forwarding the communication to another recipient WCD, but is intended to show that the initial communication can be received by multiple recipient WCDs. All wireless communication devices regularly monitor the RCH and will therefore receive the RTT. In this particular example the second group of wireless communication devices that belong to the second communication group (CG2) includes wireless communication device C 102-3 and possibly other wireless communication devices that are not illustrated for sake of convenience. It is noted that any of the wireless communication devices that belong to the second communication group (regardless of being unmuted to in-progress call of the first call or not) could also use the RTT request to initiate a new transmission or call to the second communication group (CG2), and that wireless communication device D 102-4 is used to illustrate one example.

The RTT indicates to the receiving wireless communication devices that belong to the second communication group (CG2) that a second call for the second communication group (CG2) is about to begin and that they should switch from the primary channel (PCH) to the ACH for participation in the second call. As used herein, the ACH is a pre-configured logical channel in the TDMA communication network, and access to the ACH can be controlled via a MAC layer module implemented at the wireless communication device and/or the base station. When operating in direct (or talkaround) mode, the ACH can be implemented as a pre-configured channel with another frequency different than that used to implement the inbound primary channel (PCH). When operating in indirect (or repeater) mode, the ACH can be implemented as a pre-configured channel with another frequency different than that used to implement the inbound primary channel (PCH), or can be implemented within another time slot of a TDMA channel.

In one embodiment, the RTT is a control burst transmitted over the reverse channel to the second group of wireless communication devices that are members of the second communication group (CG2). The reverse channel is an inbound channel used by wireless communication devices to transmit control or signaling information to base stations or other wireless communication devices. One one-limiting implementation of the reverse channel is described in United States Patent Application Publication Number 2007/0206533 entitled "Method And System Of Interrupting A Transmitting Subscriber In A Wireless Communication System," filed Mar. 1, 2007, which is assigned to the assignee of the present disclosure and incorporated by reference herein in its entirety. The RTT can include source and target addresses for the new call, an alternative channel identifier (ACHID), and ACH signaling information indicating to wireless communication devices of the second communication group (CG2) that the second call is about to begin for the second communication group (CG2). For example, the RTT can have a source identifier (ID) that indicates that the RTT is addressed to all wireless communication device radios that belong to the second communication group (CG2), and an alternative channel identifier (ACH_ID) that identifies the alternative channel.

In one embodiment, the reverse channel is a logical channel implemented within an uplink time slot on a particular frequency. The reverse channel can be any channel in a TDMA wireless communication system that can be used to send control/signaling information to other radios including, but not limited to, a source radio that is transmitting and/or a base station (repeater) radio. The reverse channel can be referred to as a backward channel in some systems. One non-limiting implementation of the reverse channel is described in section 5.1.5 of Part 1 DMR Air Interface Protocol. When the DMR reverse channel is utilized, the source and target addresses may use limited bits that are mapped to pre-defined addresses in a table.

All wireless communication devices in the system, including the second group of wireless communication devices that belong to the second communication group (CG2), periodically monitor the reverse channel. Upon receiving the RTT on the reverse channel, the second group of wireless communication devices (with possibly the exception of the first wireless communication device A 102-1) will then automatically switch from the reverse channel to the alternative channel (ACH) so that they can receive the second call. In the description that follows, for sake of convenience, it will be assumed that the second wireless communication device C 102-3 is the only other member of the second group of wireless communication devices. When the first wireless communication device A 102-1 receives the RTT, a prompt can be provided to indicate that the second call is about to begin. Because the first wireless communication device A 102-1 does not belong to the second communication group (CG2), when it receives the RTT, the first wireless communication device A 102-1 can either continue the first call that is in progress or dekey to end the first call as illustrated by dashed-broken line 235.

After transmitting the RTT, wireless communication device D 102-4 switches from the reverse channel to the alternative channel (ACH) (or another pre-configured channel) to initiate the second call and start the new "second" transmission, before the real transmission the WCD D will transmit several headers or preambles for a duration. The duration can vary depending on the implementation, and should be long enough for all members of the second communication group to join the second call and begin receiving the second transmission over the ACH. At communication 245, wireless communication device D 102-4 transmits a "second" transmission over the ACH, which can then be received by the second group of wireless communication devices or "members" of second communication group (CG2). This second transmission is part of the second call to the second group of wireless communication devices.

Figure 2B:
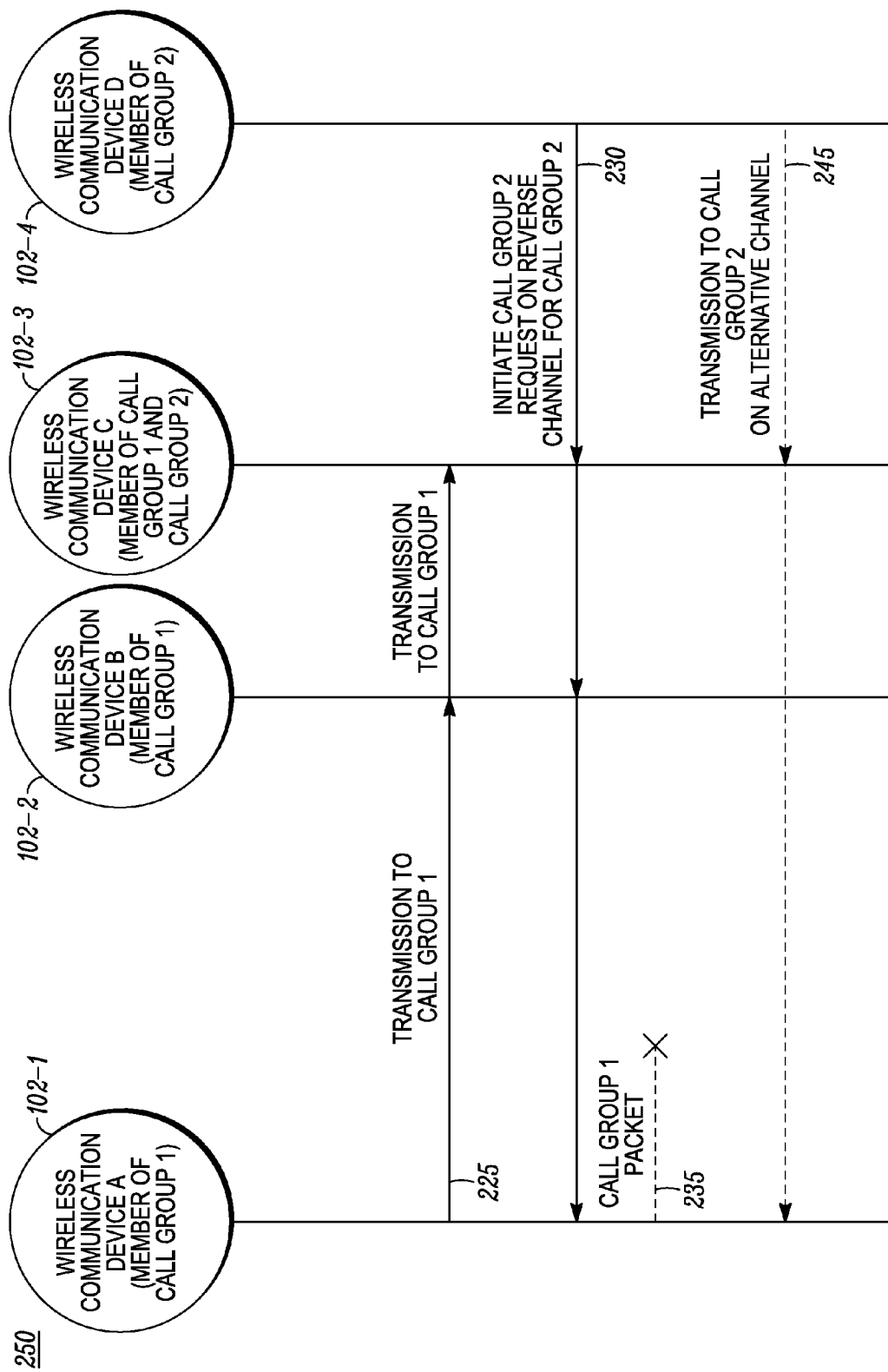
FIG. 2B is a communication flow diagram which illustrates distribution of information between wireless communication devices when the wireless communication devices are communicating with each other in direct mode in accordance with some of the other disclosed embodiments.

FIG. 2B is a communication flow diagram 250 which illustrates distribution of information between wireless communication devices 102 in accordance with other disclosed embodiments when the wireless communication devices 102 are communicating with each other in direct mode. In FIG. 2B, communication 225 represents a communication 225 as described previously herein with reference to FIG. 2A. FIG. 2B differs from FIG. 2A in that the wireless communication device A 102-1 belongs to or is a member of both the first communication group (CG1) and the second communication group (CG2). As illustrated in FIG. 2B, when the wireless communication device D 102-4 transmits the request-to-transmit (RTT) on the reverse channel at communication 230, the RTT is processed by wireless communication device A 102-1 in addition to wireless communication device C 102-3 and possibly other wireless communication devices that are not illustrated for sake of convenience.

In one implementation, when the RTT is received at wireless communication device A 102-1, a notification prompt (e.g. a visual, audio, haptic, or other prompt) is provided to wireless communication device A 102-1 to indicate that the RTT has been received.

Upon receiving the RTT, the first wireless communication device A 102-1 can decide whether to continue the first call, or discontinue/terminate the first call so that it can participate in the second call initiated by wireless communication device D 102-4. Communication 245 is shown in a dashed-line to indicate that wireless communication device A 102-1 may or may not decide to participate in the second call initiated by wireless communication device D 102-4.

Upon receiving the RTT, wireless communication device A 102-1 may stop any in-progress transmission and then switch to ACH. Thus, when the wireless communication device A 102-1 receives the RTT and decides to dekey to terminate/discontinue the first call that is in progress, the first wireless communication device A 102-1 switches from the primary channel to the alternative channel (ACH) so that when the wireless communication device D 102-4 transmits at communication 245, the wireless communication device A 102-1 will receive the second transmission that is part of the second call.

By contrast, when the first wireless communication device A 102-1 decides to continue the first call, the first wireless communication device A 102-1 can ignore the RTT and switch from the reverse channel back to the primary channel as illustrated at communication 235. As above, the second communication group (CG2) may include other wireless communication devices that are not illustrated in FIG. 1.

Figure 3A:
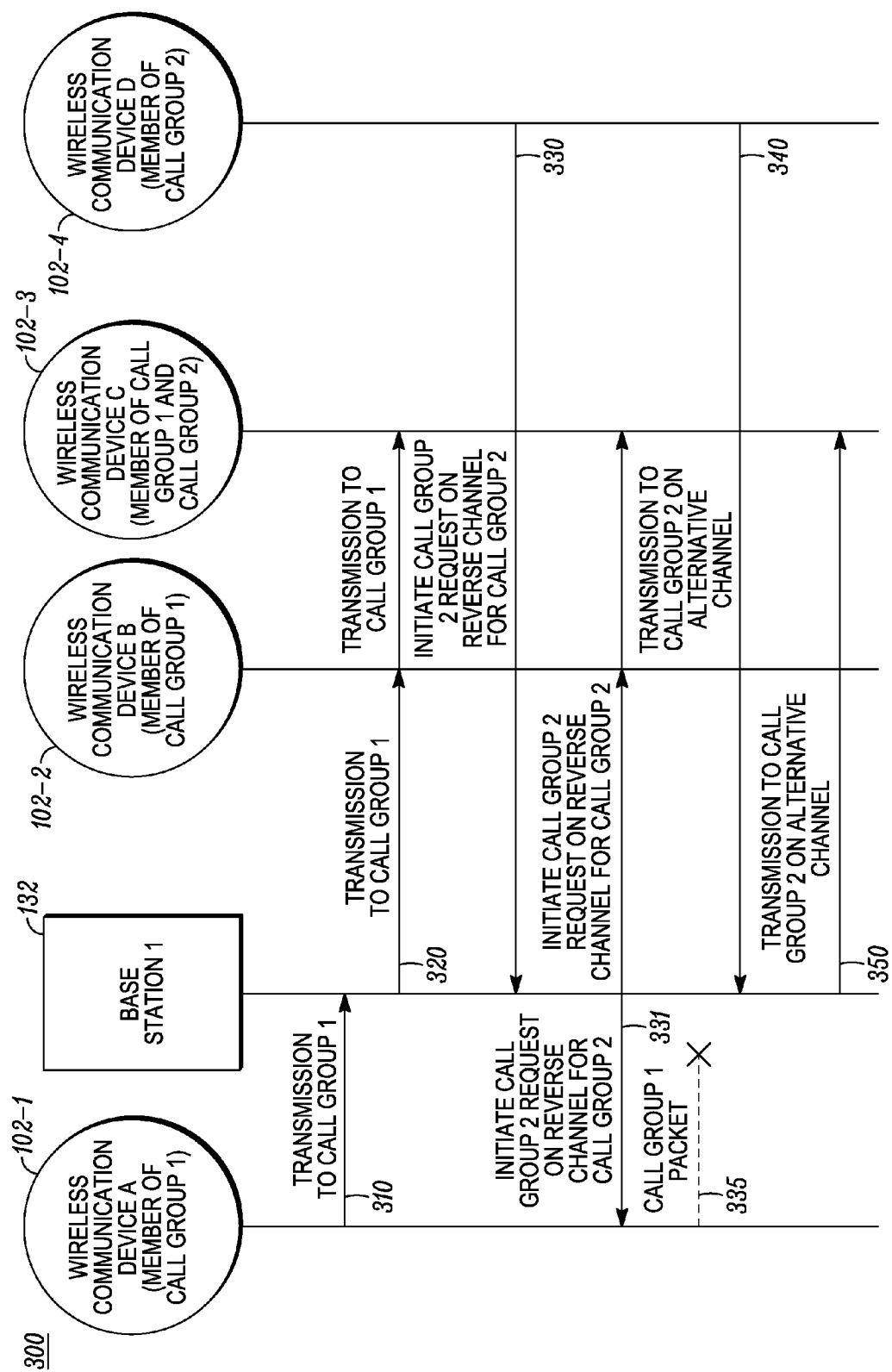
FIG. 3A is a communication flow diagram which illustrates distribution of information between wireless communication devices when the wireless communication devices are communicating with each other through a base station in accordance with some of the other embodiments.

FIG. 3A is a communication flow diagram 300 which illustrates distribution of information between wireless communication devices 102 in accordance with some embodiments when the wireless communication devices 102 are communicating with each other through a base station 132 using an indirect or "repeater" mode. As above, the communication flow diagram 300 will be described with reference to the communications network 100 of FIG. 1. In FIG. 3A, as in FIG. 2A, wireless communication device A 102-1 belongs to the first communication group (CG1) and does not belong to the second communication group (CG2), wireless communication device B 102-2 belongs to a first communication group (CG1) and does not belong to the second communication group (CG2), wireless communication device C 102-3 belongs to a first communication group (CG1) and the second communication group (CG2), and wireless communication device D 102-2 belongs to the second communication group (CG2). Further, wireless communication device A 102-1 is participating in an on-going "first" call for the first communication group (CG1), and wireless communication device D 102-2 seeks to initiate a second call with members of the second communication group (CG2) during the first call.

In FIG. 3A, because the wireless communication devices 102 are communicating with each other through the base station 132 using an indirect or "repeater" mode, any communications from the wireless communication devices are first received at a base station 132, and then retransmitted to the destination wireless communication devices.

For example, when the first wireless communication device A 102-1 transmits a first transmission over a primary channel to the first communication group (CG1) as part of the first call at communication 310, the first transmission will be received by the base station 132, which will then repeat or retransmit the first transmission over the primary channel to the first communication group (CG1) at communication 320. It is noted that in FIGS. 3A and 3B, certain communications, such as communication 320, 331 332, 350, are represented with multiple arrows to illustrate that these communications are a single message transmitted from base station 132 to multiple destination WCDs 102-2, 102-3; this illustration is not intended to indicate that one recipient WCD is repeating or forwarding the communication to another recipient WCD, but is intended to show that the communication 320 from the base station 132 can be received my multiple recipient WCDs.

In one implementation, the wireless communication device A 102-1 can monitor a common access channel (CACH) to determine if another slot is available, and if so, send the RTT on the reverse channel at communication 330. When the wireless communication device D 102-4 transmits the RTT, it is received at the base station 132. The base station 132 then repeats or retransmits the RTT on the reverse channel at communication 331 to initiate the second call to the second group of wireless communication devices that belong to the second communication group (CG2). In one implementation, the second group of wireless communication devices that belong to the second communication group (CG2) will try to detect the RTT using bit-match method. If data sync is found, the second group of wireless communication devices (that belong to the second communication group (CG2)) can decode the burst, and then switch to ACH to listen to the new "second" transmission. Other wireless communication devices (e.g., wireless communication device A 102-1 and wireless communication device D 102-4) will receive ignore the RTT upon receiving it.

At communication 340, the wireless communication device D 102-4 switches to ACH (another slot) and start the new "second" transmission (as part of the second call) over the ACH to the base station 132, which then repeats or retransmits the second transmission over the ACH to the second group of wireless communication devices at communication 350.

In FIG. 1 it is assumed that all of the wireless communication devices 102-1, 102-2, 102-3, 102-4 are located at and communicating with base station 132. However, in other embodiments, the wireless communication devices could be located at and/or communicating with different base stations 132, 134, 136, 138, in which case communications 310, 330, 340 can be forwarded from the recipient base station to the other base stations and then repeated so that group members of the second communication group (CG2) receive those communications as appropriate.

Moreover, in the non-limiting example of FIG. 3A, the second communication group (CG2) includes wireless communication device C 106. However, the second communication group (CG2) may include other wireless communication device (not illustrated). One such example will now be described below with reference to FIG. 3B, where the first wireless communication device A 102-1 also belongs to the second communication group (CG2).

Figure 3B:
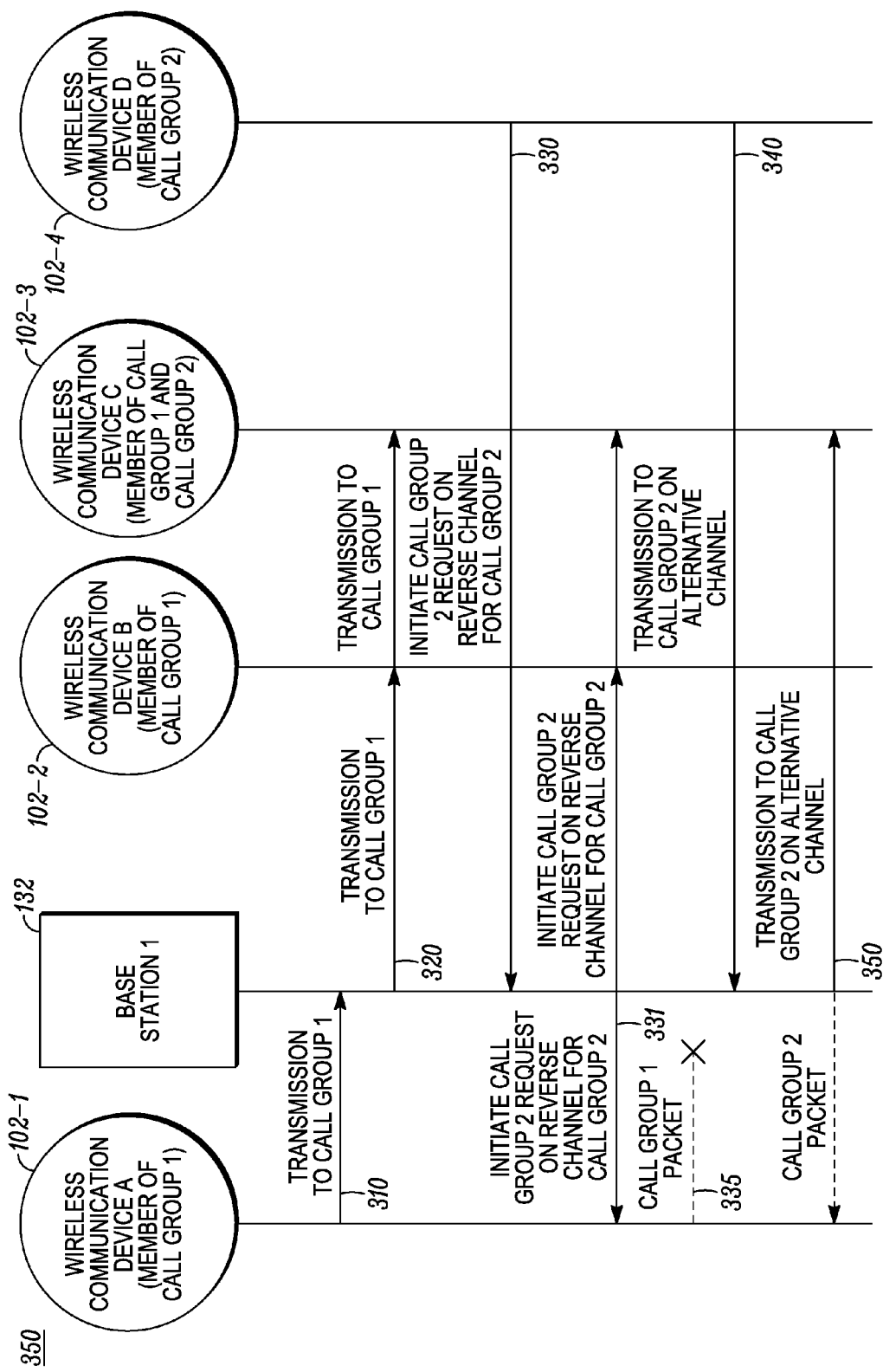
FIG. 3B is a communication flow diagram which illustrates distribution of information between wireless communication devices when the wireless communication devices are communicating with each other through a base station in accordance with of the other some embodiments.

FIG. 3B is a communication flow diagram 350 which illustrates distribution of information between wireless communication devices 102 in accordance with other disclosed embodiments when the wireless communication devices 102 are communicating with each other through the base station 132 using an indirect or "repeater" mode. FIG. 3B differs from FIG. 3A in that the wireless communication device A 102-1 belongs to both the first communication group (CG1) and the second communication group (CG2). FIG. 3B is similar to FIG. 3A except that the first wireless communication device A 102-1 also belongs to the second communication group (CG2). As above, the second group of wireless communication devices that belong to the second communication group (CG2)) may also include other wireless communication devices that are not illustrated, that may be located at other base stations.

FIG. 3B also differs from FIG. 3A in that the first wireless communication device A 102-1 has the option of deciding whether to continue first call that is in progress when it receives the RTT. In one embodiment, when the first wireless communication device A 102-1 receives the RTT, a visual prompt is provided to indicate that the second call to the second group of wireless communication devices that belong to the second communication group (CG2) is being initiated. The first wireless communication device A 102-1 may then decide whether or not to stop its in-progress transmission For example, in one implementation, upon receiving the RTT at from the base station 132 via communication 332, the operator of the first wireless communication device A 102-1 can decide whether or not to discontinue or terminate the first call, dekey, and stop its in-progress transmission (as indicated at 335).

If so, the wireless communication device A 102-1 can finish in-progress transmission, stop transmitting, and then switch from the primary channel to the pre-configured alternative channel (ACH) to listen to the new call. This is illustrated by the dotted-line arrow at communication 350, where the first wireless communication device A 102-1, receives the second transmission that is part of the second call at the first wireless communication device A 102-1 and at the second wireless communication device C 102-3.

By contrast, when the first wireless communication device A 102-1 decides to continue its in-progress transmission of the first call (as indicated at 335), the first wireless communication device A 102-1 ignores the RTT, switches from the reverse channel back to the primary channel, and continues its first call.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Even though the communication flow diagrams can be interpreted to imply some ordering in which the communications of methods 200, 250, 300, 350 are performed, those skilled in the art will appreciate that the various steps shown can be performed in an order different than is shown and further that the various steps can take place in parallel. As such, the various steps do not necessarily have to be performed in the particular order shown in FIGS. 2A-3B unless the context implies that such ordering would be necessary (e.g., a step relies on a previous step).

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a non-transitory computer-readable storage medium having computer readable code stored thereon for programming a computer (e.g., comprising a processor) to perform a method as described and claimed herein. Non-transitory computer-readable media comprise all computer-readable media except for a transitory, propagating signal. Examples of such non-transitory computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method, comprising:
    transmitting, from a first wireless communication device A, a first transmission over a primary channel to a first communication group (CG1) as part of a first call, wherein the first communication group (CG1) includes a second wireless communication device C that also belongs to a second communication group (CG2);
    transmitting, from a third wireless communication device D during the first call, a request-to-transmit (RTT) on a reverse channel to initiate a second call with to a second group of wireless communication devices that belong to the second communication group (CG2);
    receiving the RTT at the second group of wireless communication devices, and in response, switching from the primary channel to an alternative channel;
    transmitting a second transmission as part of the second call from the third wireless communication device D over the alternative channel to the second group of wireless communication devices; and
    receiving the second transmission at the second group of wireless communication devices.

2. A method according to claim 1, wherein the second group of wireless communication devices that belong to the second communication group (CG2)) further comprises the first wireless communication device A, and further comprising:
    upon receiving the RTT at the first wireless communication device A, deciding whether to continue first call.

3. A method according to claim 2, when the first wireless communication device A decides to discontinue first call, further comprising:
    terminating the first call that is in progress;
    wherein the step of switching from the primary channel to the alternative channel, further comprises:
    switching from the primary channel to the alternative channel upon receiving the RTT at the first wireless communication device A; and
    wherein the step of receiving the second transmission further comprises:
    receiving the second transmission that is part of the second call at the first wireless communication device A and at the second wireless communication device C.

4. A method according to claim 2, when the first wireless communication device A decides to continue first call, further comprising:
    ignoring the RTT at the first wireless communication device A; and
    switching from the reverse channel back to the primary channel at the first wireless communication device A.

5. A method according to claim 1, when the first wireless communication device A does not belong to the second communication group (CG2), and further comprising:
    receiving the RTT at the first wireless communication device A, ignoring the RTT, and continuing the first call that is in progress unless the first wireless communication device A dekeys to end the first call.

6. A method according to claim 1, wherein the step of transmitting, from a first wireless communication device A, a first transmission over the primary channel to a first communication group (CG1) as part of a first call, comprises:
    transmitting, from a first wireless communication device A, a first transmission over the primary channel to a base station as part of the first call; and
    transmitting the first transmission, from the base station over the primary channel to the first communication group (CG1) as part of the first call.

7. A method according to claim 6, wherein the step of transmitting, from a third wireless communication device D during the first call, a request-to-transmit (RTT), comprises:
    transmitting, from the third wireless communication device D during the first call, a request-to-transmit (RTT) on the reverse channel to the base station; and
    transmitting the request-to-transmit (RTT) from the base station on the reverse channel during the first call to initiate a second call with the second group of wireless communication devices.

8. A method according to claim 7, wherein the step of transmitting a second transmission, comprises:
    transmitting the second transmission as part of the second call from the third wireless communication device D over the alternative channel to the base station; and
    transmitting the second transmission from the base station over the alternative channel to the second group of wireless communication devices.

9. A method according to claim 8, wherein the second group of wireless communication devices that belong to the second communication group (CG2)) further comprises the first wireless communication device A, and further comprising:
    upon receiving the RTT at the first wireless communication device A, deciding whether to continue first call.

10. A method according to claim 9, when the first wireless communication device A decides to discontinue first call, further comprising:
    terminating the first call that is in progress;
    wherein the step of switching from the primary channel to the alternative channel (ACH), further comprises:
    switching from the primary channel to the alternative channel upon receiving the RTT at the first wireless communication device A; and
    wherein the step of receiving the second transmission further comprises:

receiving the second transmission that is part of the second call at the first wireless communication device A and at the second wireless communication device C.

11. A method according to claim 9, when the first wireless communication device A decides to continue first call, further comprising:
ignoring the RTT at the first wireless communication device A; and
switching, the first wireless communication device A, from the reverse channel back to the primary channel.

12. A system, comprising:
a first wireless communication device A that transmits a first transmission over a primary channel to a first communication group (CG1) as part of a first call;
a second wireless communication device C that belongs to the first communication group (CG1) and to a second communication group (CG2);
a third wireless communication device D that transmits a request-to-transmit (RTT) on a reverse channel during the first call to initiate a second call with a second group of wireless communication devices that belong to the second communication group (CG2),
wherein the second group of wireless communication devices switch from the primary channel to an alternative channel in response to the RTT to receive the second call.

13. A system according to claim 12, wherein the second group of wireless communication devices that belong to the second communication group (CG2)) further comprises the first wireless communication device A, wherein the first wireless communication device A decides whether to continue the first call upon receiving the RTT.

14. A system according to claim 13, when the first wireless communication device A decides to discontinue first call, wherein the first wireless communication device A terminates the first call that is in progress, and switches from the primary channel to the alternative channel to receive the second call.

15. A system according to claim 13, when the first wireless communication device A decides to continue first call, wherein the first wireless communication device A ignores the RTT, and switches from the reverse channel back to the primary channel.

16. A system according to claim 12, when the first wireless communication device A does not belong to the second communication group (CG2), wherein the first wireless communication device A ignores the RTT, and continues the first call that is in progress.

17. A system according to claim 12, further comprising:
a base station, wherein the first wireless communication device A transmits the first transmission over the primary channel to the base station as part of the first call, and wherein the base station repeats the first transmission over the primary channel to the first communication group (CG1).

18. A system according to claim 17, wherein the third wireless communication device D transmits the request-to-transmit (RTT) on the reverse channel to the base station during the first call, and wherein the base station repeats the request-to-transmit (RTT) on the reverse channel during the first call to initiate a second call with the second group of wireless communication devices.

19. A system according to claim 18, wherein the third wireless communication device D transmits the second transmission over the alternative channel to the base station, and wherein the base station transmits the second transmission over the alternative channel to at least the second group of wireless communication devices.

20. A system according to claim 19, wherein the second group of wireless communication devices that belong to the second communication group (CG2)) further comprise the first wireless communication device A, and wherein the first wireless communication device A decides whether to continue the first call upon receiving the RTT;
wherein the first wireless communication device A ignores the RTT and switches from the reverse channel back to the primary channel when the first wireless communication device A decides to continue first call, and
wherein the first wireless communication device A terminates the first call that is in progress, and switches from the primary channel to the alternative channel to receive the second call when the first wireless communication device A decides to discontinue first call.

* * * * *